United States Patent
Surpin

(12) 
(10) Patent No.: US 6,409,796 B1
(45) Date of Patent: Jun. 25, 2002

(54) METHOD FOR PRODUCTION OF TANTALUM AND NIOBIUM POWDERS WITH HIGHLY DEVELOPED SURFACE

(75) Inventor: Dina Surpin, Rehovot (IL)

(73) Assignee: Advanced Alloy Technologies, Ltd., Migdal Haemek (IL)

(*) Notice: Subject to any disclaimer, the term of this patent is extended or adjusted under 35 U.S.C. 154(b) by 34 days.

(21) Appl. No.: 09/684,172

(22) Filed: Oct. 6, 2000

(30) Foreign Application Priority Data

Oct. 8, 1999 (IL) .................................................. 132291

(51) Int. Cl.$^7$ ................................ B22F 3/10; C22C 1/08; C22C 1/04
(52) U.S. Cl. ......................... 75/255; 75/228; 419/30; 419/35; 419/64; 148/513; 428/402
(58) Field of Search .................... 75/228, 255; 148/513; 419/35, 30, 64; 428/402

(56) References Cited

U.S. PATENT DOCUMENTS

| | | | |
|---|---|---|---|
| 4,277,543 A | * | 7/1981 | Nakata et al. ............... 428/546 |
| 4,627,959 A | * | 12/1986 | Gilman et al. ................. 419/61 |
| 4,640,816 A | * | 2/1987 | Atzmon et al. ............... 419/24 |
| 5,211,741 A | | 5/1993 | Fife |
| 5,261,942 A | | 11/1993 | Fife et al. |
| 5,580,367 A | | 12/1996 | Fife |
| 6,231,689 B1 | * | 5/2001 | Fife ............................ 148/281 |
| 6,261,337 B1 | * | 7/2001 | Kumar ........................ 75/255 |

FOREIGN PATENT DOCUMENTS

SU 1725273 A1 4/1992

* cited by examiner

Primary Examiner—Daniel J. Jenkins
(74) Attorney, Agent, or Firm—Greer, Burns & Crain, Ltd.

(57) ABSTRACT

A method of treatment a metal powder to increase its surface area is presented. The metal powder to be treated is selected from a group consisting of tantalum, niobium and mixtures thereof. The method utilizes mechanical alloying applied to an initial selected metal powder and an auxiliary substance having relatively weak corrosion resistance as compared to that of the selected metal. The mechanical alloying is continued until a solid solution of the selected metal and the substance is obtained, in which the selected metal particle has a substantially developed surface area and is at least partly wetted with the substance substantially within a surface region of the selected metal particle. The substance is then removed from the obtained solid solution, thereby leaving the selected metal particles with the substantially developed surface area free of the substance.

27 Claims, 1 Drawing Sheet

METHOD FOR PRODUCTION OF TANTALUM AND NIOBIUM POWDERS WITH HIGHLY DEVELOPED SURFACE

FIELD OF THE INVENTION

This invention is generally in the field of physical-chemical treatment, and relates to a method of obtaining tantalum, niobium or tantalum-niobium powders with a highly developed surface. The invention is particularly useful for manufacturing electrolytic capacitors.

BACKGROUND OF THE INVENTION

Capacitors serve for storing an electrical charge for a later use. Electrolytic capacitors are typically manufactured from aluminum or tantalum powder. Tantalum and niobium (as well as tantalum-niobium) capacitors have become the preferred type, due to their relatively high reliability, long service life, and high capacitance and voltage ranges at relatively small dimensions, as compared to the aluminum ones. More specifically, tantalum capacitors have as much as three times better capacitance/volume efficiency than the aluminum capacitors.

Generally, a capacitor is formed by two spaced-apart conducting surfaces (usually metal plates) serving as electrodes, and the space between them is filled with an insulating or dielectric material. The dielectric used in tantalum capacitors is tantalum pentoxide that possesses high dielectric strength and a high dielectric constant. As capacitors are being manufactured, a film of tantalum pentoxide is applied to the electrodes by means of an electrolytic process.

The capacitance, C, of a capacitor is determined by the surface area of the two electrodes, the distance therebetween and dielectric constant of the insulating material, that is $$C = \frac{\varepsilon \cdot A}{t}$$

wherein $\varepsilon$ is the dielectric constant, A is the surface area; and t is the distance between the electrodes.

In tantalum electrolytic capacitors, the distance between the electrodes is very small, since it is only the thickness of the tantalum pentoxide film. As the dielectric constant of the tantalum pentoxide is extremely high ($\varepsilon \approx 26$), the capacitance of the tantalum capacitor is also very high and can be increased even more, if the surface area of the electrodes is increased.

Tantalum capacitors contain either liquid electrolytes (sulfuric acid) or solid electrolytes forming the cathode electrode, while the anode is formed by the tantalum pellet provided with a lead wire embedded in or welded to the pellet. This anode has an enormous surface area for its size because of the way it is made. The entire construction is enclosed in a hermetically sealed case.

The above construction, utilizing for example a liquid electrolyte, is typically manufactured in the following manner. Tantalum powder of suitable fineness, typically 2–5 $\mu$m, (sometimes mixed with a binding agent) is machine-pressed into pellets. The next step is a sintering operation in which binders, impurities and contaminants are vaporized, and the tantalum particles are sintered (welded) into a porous mass with a very large internal surface area. During this step, metallic links and electrical contacts between tantalum particles are created. In addition, a tantalum wire is introduced into the powder prior to sintering so as to form a contact of the future anode. In some cases, the lead is embedded during pressing of the pellet before sintering. A film of tantalum pentoxide is electrochemically formed on the surface area of the fused tantalum particles. Provided that sufficient time and current are available, the oxide will grow to a thickness determined by the applied voltage. The pellet is then inserted into a tantalum or silver can, which contains an electrolyte solution. Most liquid electrolytes are gelled to prevent the free movement of the solution inside the container and to keep the electrolyte in intimate contact with the capacitor cathode. A suitable end-seal arrangement prevents the loss of the electrolyte.

As to the solid electrolyte based tantalum capacitors, the electrolyte is usually a manganese dioxide formed on a tantalum pentoxide dielectric layer. This construction is manufactured by impregnating the pellet with a solution of manganous nitrate, and then heating the pellets in an oven, thereby converting the manganous nitrate into manganese dioxide. The pellet is next coated and sealed.

The tantalum capacitor can be either of a volume or of a foil type, in which case the anode is formed by a tantalum foil.

Various techniques for the manufacture of tantalum powders have been developed. They typically include the following stages:

dissolving the ore;
  extraction and precipitation of tantalum hydroxide;
  calcination of tantalum hydroxide and conversing it into tantalum pentoxide; and
  reduction of the pentoxide into tantalum metal powder, e.g., with sodium vapor.

It is understood that the capacitance of a tantalum capacitor depends on the total surface area of a tantalum powder used in the manufacture of this capacitor. The larger the total surface area, the larger the capacitance. The total surface area of the tantalum powder can be increased either by decreasing the particles' size, or by developing their surface area. However, the decrease of the particles' size is limited to that (0.5.–1.0 $\mu$m) required for providing electrical contact between the particles. When lowering the particle size, the possibility of contact breaking significantly increases. The reduction in particle size also suffers from the unavoidable requirement of high-energy treatment that is very complicated and expensive.

The surface developing techniques include the production of flakes or fragmentation-like powders with the particle size of 2÷50 $\mu$m. Known techniques of surface development allow for achieving a roughness factor not exceeding 2. Maximal surface area of the tantalum powder that is obtainable by the conventional techniques is about 0.1–0.5 m²/g (BET).

Techniques aimed at increasing the surface area of a tantalum powder have been developed, and are disclosed, for example, in U.S. Pat. Nos. 5,261,942; 5,580,367 and 5,211,741. According to this technique, the BET surface area of a tantalum powder is developed up to 0.6 m²/g by producing a flaked tantalum and reducing the flake size by fracturing without substantially reducing the thickness or tapering the peripheral edges of the flakes. This is implemented by embrittling the conventional tantalum flake by hydriding, oxidizing, cooling to low temperatures or the like to enhance breakage when reducing flake particle size by mechanical means. Thereafter, the so treated tantalum powder is treated by mechanical means such as a vibratory ball mill, and then an additional temperature treatment is applied to the mechanically treated tantalum powder.

Further increase of the surface area of tantalum powder is desired. This, on the one hand, would allow miniaturization of electronic devices utilizing tantalum capacitors, and, on the other hand, would enable to obtain the same operational parameters of the capacitor whilst saving such an expensive raw material as tantalum.

SUMMARY OF THE INVENTION

There is accordingly a need in the art for a technique enabling to increase the surface area of a tantalum, niobium or tantalum-niobium powder.

The present invention takes advantage of the use of the principles of a mechanical alloying technique for developing the surface area of a selected metal powder obtained by any known technique.

The term "selected metal" used herein signifies a metal selected from a group consisting of tantalum, niobium, and mixtures thereof with the tantalum/niobium composition ratio (Ta:Nb) ranging between 1:9 and 9:1.

The main idea of the present invention is based on the following. The mechanical alloying technique generally consists of alloying powders of different metals without resorting to external heating or chemical processing. The present invention utilizes equipment commonly used in mechanical alloying processes, such as different mills, attritors, grinders, but uses a specific operational mode and specific additional powders to obtain a solid solution in which the selected metal particles are at least partly wetted with the additional powder. This additional powder is preferably a metal, such as Fe, Cu, Mn, Ti, Ni, Mg, Al, Zn, Cd, Co, Mo, having relatively weak corrosion resistance as compared to that of selected metal. In other words, the present invention utilizes such operational modes as to provide the alloying of the selected metal particles in their surface region only. The step of alloying is followed by a step of removing the additional powder (metal) from the surface of the selected metal particles. This may be implemented by chemical etching.

There is thus provided according to one aspect of the present invention, a method of treatment of an initial powder of a metal selected from a group consisting of tantalum, niobium and mixtures thereof for developing the surface of the initial selected metal powder particles, the method comprising the steps of:

(a) mechanically alloying the initial selected metal powder with a powder of an auxiliary substance having relatively weak corrosion resistance as compared to that of the selected metal, thereby providing interaction between the particles of the selected metal and the substance powders, wherein the mechanical alloying is continued until a solid solution of the selected metal and the substance is obtained, in which the selected metal particle has a substantially developed surface area and is at least partly wetted with said substance substantially within a surface region of the selected metal particle; and (b) removing the substance from the obtained solid solution, thereby leaving the selected metal particles with the substantially developed surface area free from the substance.

Preferably, the substance is removed by chemical etching. The auxiliary substance may contain at least one metal or metal alloy. These at least one metal is either one of the following list: Fe, Cu, Mn, Ti, Ni, Mg, Al, Zn, Cd, Co, Mo or any suitable metal alloy, for example a steel powder or an amorphous powder.

Preferably, the chemical etching utilizes an acid solution as an active ingredient, for example $HNO_3$, $HCl$ or $H_2SO_4$, or a mixture of either two of them.

Preferably, the chemical etching comprises at least two sequential cycles, each next cycle starting with removing reaction products and adding an additional portion of the acid. The etching also includes heating of the reacting products up to a predetermined temperature, for example in the range 80–90°. Generally speaking, this temperature is such as to cause low boiling of the reacting products.

The method may also comprise the step of applying a decantation process to obtain a flushed powder of the selected metal, upon completing the etching, and may also comprise washing of the flushed metal powder by using a dialysis unit. This washing is preferably carried out with the applied voltages within the range 200–400V. The washing procedure proceeds until the specific resistance of water reaches the value of $10^{-6}$ $Ohm^{-1}cm^{-1}$.

Additionally, the method may comprise filtering and drying of the obtained powder. The drying proceeds at the temperature of approximately 120°.

The method may also comprising the classification procedure aimed at removing particles having dimensions less than a desired value.

The method according to the invention enables to obtain the alloying depth of 10–20% of the selected metal particle's size. The method may utilize initial selected metal powder having particles size in the range of about 0.2–50 $\mu$m.

According to another aspect of the present invention there is provided a metal powder having substantially increased BET surface area prepared by the above-described method from an initial powder of a metal selected from a group consisting of tantalum, niobium and mixtures thereof, wherein the increased surface area reaches 40 $m^2/g$ and more.

According to yet another aspect of the present invention, there is provided an electrode having substantially increased surface area and capable of having substantially high specific charge, which electrode is fabricated from the above metal powder.

According to yet another aspect of the present invention, there is provided a capacitor containing the above electrode.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
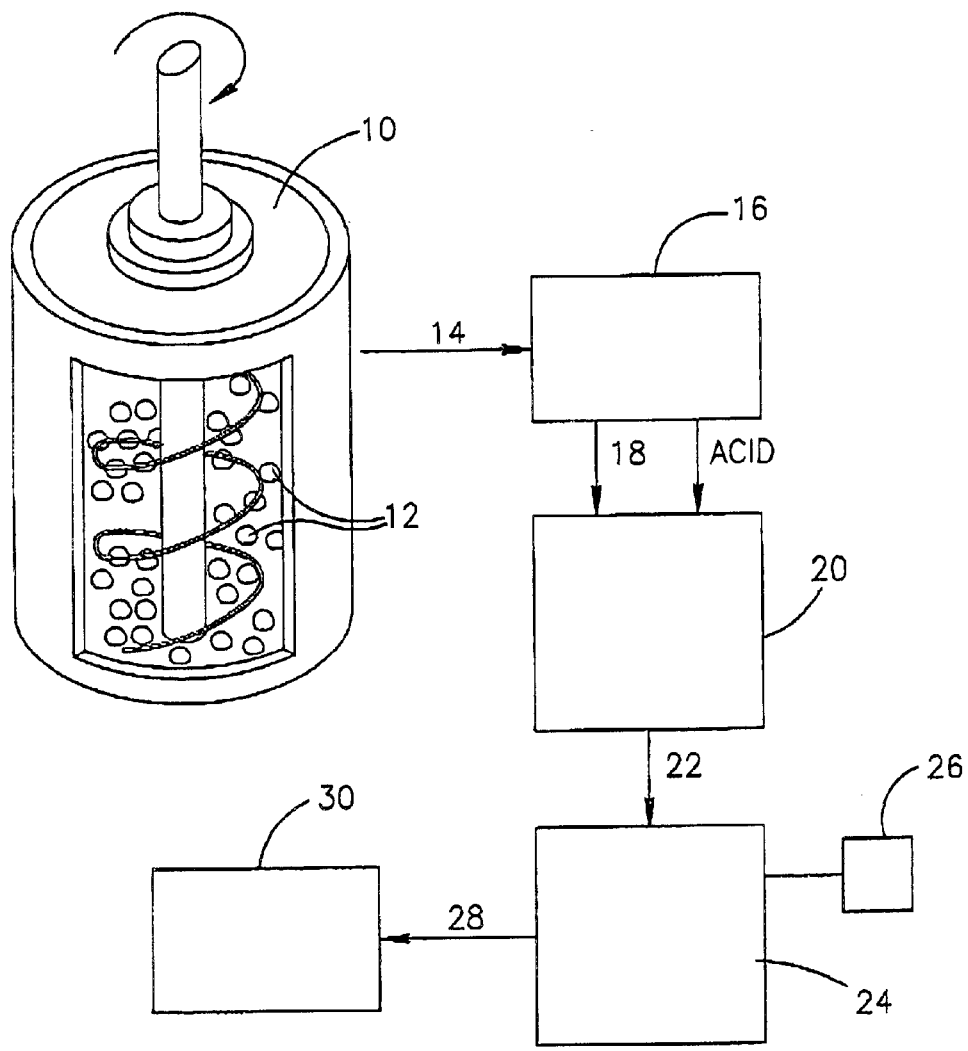
FIG. 1 is a block diagram of the main operational steps of a method according to the invention.

Referring to FIG. 1, the main operational steps of a method according to the invention are schematically illustrated. The method is described below with respect to the treatment of a tantalum powder to increase its surface area. However, as will be described with reference to Examples 4 and 5, the method can be utilized for the treatment of a niobium powder and mixtures of tantalum and niobium powders.

A tantalum powder manufactured by any suitable technique, for example that powder commercially available from Cabot, USA, having typical particle size of 5 $\mu$m, is charged into an attritor 10. It should, however, be noted that generally particle's size of the initial tantalum powder (i.e., to be treated by the technique according to the invention), may be in the range 0.2–50 μm and may be of any shape, e.g., flakes. The attritor 10 contains metal balls 12 (typically hard steel) approximately 5 mm in diameter. Also charged in the attritor 10, is a ferrous powder having particles of 3–5 μm in size. In the present example, 8 g of the tantalum powder and 3 g of the ferrous powder are used. The attritor 10 is put into operation for 25 minutes, and a mixture 14 containing a solid solution of tantalum-ferrous powder and the balls 12 is produced. The rotation speed of the attritor activator (impeller) is within the range of 250–1800 rpm. The energy load of the attritor is about 60G–100G (where G is the gravity acceleration), the ratio of the motor power and the weight of the treated material being 10–30 W/g. As to the powder-to-ball weight ratio, it ranges from 20 to 40.

The attritor 10 constitutes a ball mill. Generally, the types of ball mills, which can be employed in the present invention, include shakers, vibratory mills, stirred mills, centrifugal mills, etc. The construction and operation of such ball mills are known per se, and therefore need not be specifically described, except to note the following. During the operation of the ball mill, tantalum and ferrous particles undergo severe plastic deformation, which changes their surface-to-volume ratio. The grinding balls 12 are decelerated and transfer their energy to the plastically deforming metals. Where the metal particles overlap, automatically clean metal interfaces are brought into intimate contact forming cold welds, and build up composite metal particles consisting of a combination of the initial ingredients (i.e., Ta and Fe).

The solid solution produced by 25 minutes' operation of the attritor 10 contains tantalum particles at least partly wetted with the ferrous, i.e., tantalum particles alloyed (or micro-forged) with ferrous at the surface regions only. This process enables to obtain the alloying depth of 10–20% of the particle's size. A very important parameter is the energy of the balls' interaction. This parameter is associated with the ball mill volume and power used therein. The solid solution could be obtained in either one of the conventional ball mills, the time needed for carrying out the process depending on the parameters of the specific ball mill.

Figure 2:
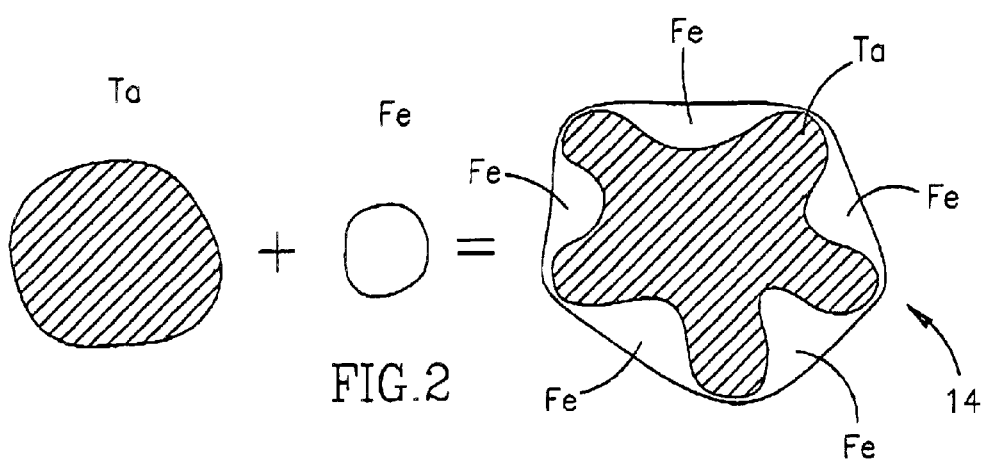
FIG. 2 is a schematic illustration of the interaction between a powder of a selected metal (e.g., tantalum) and a powder of an auxiliary substance, according to the method of the present invention.

FIG. 2 illustrates the results of the interaction between the tantalum particles Ta and those of the auxiliary metal (Fe in the present example) in the attritor 10. As shown, the particle of the obtained solid solution 14 is in the form of the tantalum particle with a highly developed surface alloyed with ferrous at the surface regions only.

It is important to note that, if this process proceeds in accordance with a conventional mechanical alloying mode (which is much more durable process), the metal components involved would become substantially homogenized.

Thereafter, the mixture 14 is discharged from the attritor 10 and supplied to a separator 16. The separator 16 may be any known suitable means, for example, a sieve with the cell dimensions of 2–3 mm. This process consists of separating the metal balls 12 from the Ta/Fe solid solution 18.

The separated Ta/Fe solid solution 18 is charged into a chemical vessel 20 of 250 ml volume, and a 100 ml of acid solution is added into the chemical vessel 20 (e.g., $HNO_3$, HCl or $H_2SO_4$, of various different concentrations, or their mixtures 1:1, 1:2 or 1:3). After the reaction between the acid and ferrous at room temperature is complete, the entire solution is brought to low boiling, and is left to react for about 4 hours. The entire solution undergoes decantation, and a new portion of acid is charged into the vessel 20 with subsequent heating up to 80–90° during a time period needed for complete removal of ferrous. This process utilizes the principles of chemical etching.

The tantalum powder precipitates at the bottom of the vessel 20, and the reaction product (e.g., solution of ferrous salt) is poured off the vessel 20. To this end, a decantation process is applied using several portions of acid solution 1:10 and distilled water to obtained flushed tantalum powder.

The flushed tantalum powder 22 is transferred into a dialysis unit 24, where a washing process is carried out at voltages 200–400V until the specific resistance of water reaches $10^{-6}$ $Ohm^{-1}cm^{-1}$. To this end, a control unit 26, for example a conductometer, is used for controlling the changes of specific resistance of water.

The washed tantalum powder 28 is then filtered and dried in a drying stove 30. The drying process proceeds within 1.5–2 hours at a temperature of approximately 120°. It should be noted that an additional classification process can be performed at this stage, as well as after the chemical etching stage.

Following are three examples of a method according to the invention for the manufacture of a tantalum powder utilizing different auxiliary substances. A specific surface area, S, of a sample of the so-obtained tantalum powder was determined and compared to that of the initial tantalum powder. Surface area calculation utilizes the known Nitrogen low temperature absorption method (method BET).

EXAMPLE 1

In this example, ferrous powder is used as the auxiliary substance. Table I presents experimental conditions and results for two different samples $S_1$ and $S_2$ (Ta—Fe mixtures) treated under different conditions.

TABLE I

| Parameters | $S_1$ | $S_2$ |
| --- | --- | --- |
| Quantity (Ta + Fe), g | (10 + 3) | (6 + 2) |
| Powder-to-ball weight ratio | 1:20 | 1:30 |
| Activator rotation velocity (rpm) | 800 | 1500 |
| Treatment time, min | 25 | 60 |
| Initial Ta powder - S, $m^2/g$ (BET) | 0.12 | 0.12 |
| Resulting powder - S $m^2/g$ (BET) | 2.5 | 8.6 |

EXAMPLE 2

In this example, a copper powder is used as the auxiliary substance. Table II presents experimental conditions and results for two different samples $S_3$ and $S_4$ (different Ta—Cu mixtures treated under different conditions). Tantalum powder (10 g in $S_3$ and 7 g in $S_4$) having 10 μm particles and copper powder (4 g and 3 g, respectively) with 3 μm particles are charged into the attritor (or the like) loaded with steel balls of 5 mm diameter. The attritor is activated for 40 and 65 minutes operation, respectively, and the obtained mixture is then discharged from the attritor onto a 2–3 mm sieve for separating the solid solution from the balls. The solid solution free from balls is transferred to the chemical vessel of 250 ml capacity, into which 50 ml of $HNO_3$ water solution 1:1 is added for chemical etching of the auxiliary metal. After the completeness of the chemical reaction at room temperature, the entire solution is brought to weak boiling, and the process of copper dissolving continues for 3 hours. Thereafter, the solution is decantated, and a new portion of $HNO_3$ solution is added, followed by a further heating up to 60–80° C. Further treatment is similar to that described above with respect to the example based on the use of ferrous as the auxiliary substance.

TABLE II

| Parameters | $S_3$ | $S_4$ |
|---|---|---|
| Quantity (Ta + Cu), g | (10 + 4) | (7 + 3) |
| Powder-to-ball weight ratio | 1:30 | 1:25 |
| Activator rotation velocity (rpm) | 900 | 1400 |
| Treatment time, min | 40 | 65 |
| Initial Ta powder - S, $m^2/g$ (BET) | 0.12 | 0.12 |
| Resulting powder - S, $m^2/g$ (BET) | 3.2 | 7.0 |

EXAMPLE 3

In this example, an aluminum powder is used as the auxiliary substance. Table III presents experimental conditions and results, for two different samples $S_5$ and $S_6$ (different Ta—Al mixtures treated under different conditions). Tantalum powder having 10 μm particles and aluminum powder having 3–5 μm particles are charged into the attritor loaded with steel balls of 5 mm diameter. The attritor is activated for 45 and 60 minutes operations, respectively, and the obtained mixture is discharged from the attritor onto a 2–3 mm sieve for separating the solid solution from the balls. The solid solution is transferred to a chemical vessel of 250 ml capacity into which 100 ml of hydrochloric acid (20%) is added slowly. After complete removal of aluminum, a decantation process is applied using several portions of acid solution and distilled water to obtain flushed tantalum powder. Then, the washed tantalum powder is filtered and dried in a drying stove during 1.5–2 hours at the temperature of approximately 120°.

TABLE III

| Parameters | $S_5$ | $S_6$ |
|---|---|---|
| Quantity (Ta + Al), g | (11 + 6) | (13 + 3) |
| Powder-to-ball weight ratio | 1:40 | 1:30 |
| Activator rotation velocity (rpm) | 1000 | 1300 |
| Treatment time, min | 45 | 80 |
| Initial Ta powder - S, $m^2/g$ (BET) | 0.50 | 0.50 |
| Resulting powder - S $m^2/g$ (BET) | 10.6 | 22.5 |

The following are two example (Examples 4 and 5) of a method according to the invention for the treatment of a niobium powder and a niobium-tantalum mixtures, respectively, to obtain particles with highly developed surface. Similarly, specific surface area, S, of a sample of the so-obtained powder (niobium powder and niobium-tantalum powder) was determined and compared to that of the initial powder. Surface area calculation utilizes the BET method.

EXAMPLE 4

In this example, an aluminum powder is used as the auxiliary substance. Two different samples $S_7$ and $S_8$ (different Nb—Al mixtures) are treated under different conditions. Experimental conditions and results are presented in Table IV.

Niobium powder having 1–5 μm particles and aluminum powder with 3–5 μm particles are charged into an attritor (or the like) loaded with steel balls of a 5 mm diameter. The attritor is activated for 30 minutes operation with respect to the sample $S_7$ and for 60 minutes operation with respect to the sample $S_8$. The obtained mixture is then discharged from the attritor onto a 2–3 mm sieve for separating the solid solution from the balls. Thereafter, the solid solution free from balls is transferred to a chemical vessel of 250 ml capacity, into which 100 ml of hydrochloric acid (10–15%) is added slowly.

After two hours, the solution is decanted, and new portion of acids is added, followed by a further heating up to 80–90° C. After complete removal of aluminum, a decantation process is applied using several portions of acid solution and distilled water to obtain flushed niobium powder. The washed niobium powder is then filtered and dried in drying stove during 1.5–2 hours at a temperature of approximately 120° C.

TABLE IV

| Parameters | $S_7$ | $S_8$ |
|---|---|---|
| Quantity (Nb + Al), g | (9.3 + 3.2) | (7.8 + 3.2) |
| Powder-to-ball weight ratio | 1:40 | 1:30 |
| Activator rotation velocity (rpm) | 800 | 1000 |
| Treatment time, min | 30 | 60 |
| Initial Nb powder - S, $m^2/g$ (BET) | 0.14 | 0.14 |
| Resulting Nb powder - S, $m^2/g$ (BET) | 13.7 | 30.8 |

EXAMPLE 5

In this example, an aluminum powder is used as the auxiliary substance. Each of the samples $S_9$, $S_{10}$ and $S_{11}$ composed of a mixtures (1:1, 1:4 and 4:1 by weight, respectively) of Niobium powder having 1–5 μm particles and Tantalum powder having 7–8 μm particles, and containing an aluminum powder with 10 μm particles, is charged into the attritor loaded with steel balls of a 5 mm diameter. The attritor is activated for 40 minutes operation, and the so-obtained mixture is discharged onto a 2–3 mm sieve. Further treatment is similar to that of the above-described example.

TABLE V

| Parameters | $S_9$ | $S_{10}$ | $S_{11}$ |
|---|---|---|---|
| Composition of mixture (Ta:Nb) | 1:1 | 4:1 | 1:4 |
| Quantity (Ta + Nb + Al), g | 3.5 + 3.5 + 3.2 | 4.8 + 1.2 + 3 | 1.2 + 4.8 + 3 |
| Powder-to-ball weight ratio | 1:25 | 1:25 | 1:2 |
| Activator rotation velocity (rpm) | 1100 | 1100 | 1100 |
| Treatment time, min | 40 | 40 | 40 |
| Initial Nb—Ta powder - S, $m^2/g$ (BET) | 0.1 | 0.08 | 0.12 |
| Resulting Nb—Ta powder - S, $m^2/g$ (BET) | 39.8 | 20.4 | 25.3 |

Generally, the auxiliary substance can be either one of the following metals Fe, Cu, Mn, Ti, Al, Mg, Zn, Cd, Ni, Co or Mo, any suitable metal alloy, for example, steel powder or amorphous powder. To impart sufficient hardness (e.g., 20–60 units) to the steel powder, it could undergo appropriate thermal treatment.

It should be noted that, generally, the chemical etching aimed at removing the auxiliary substance could be replaced by any other suitable technique, for example a re-smelting process. In other words, the solid solution undergoes heating up to the melting temperature of the respective auxiliary substance. In this case, however, the tantalum/niobium particle will absorb gases (e.g., oxygen) during the heating procedure, which gases should then be appropriately removed.

The advantages of the present invention are self-evident. The method according to the invention enables to significantly increase the surface area of tantalum/niobium powder or mixture thereof (generally up to 40 $m^2/g$ and more), and consequently provide desirable increase of the specific charge of the so-obtained powder.

It should be understood that an electrode having such an increased surface area and, therefore, capable of having a high specific charge could be prepared from the tantalum/niobium powder obtained by the invented method, using, for example, the known sintering-based technique. Consequently, less tantalum/niobium powder is needed for manufacturing capacitors containing these electrodes, considering the same surface area and electrical parameters as in the conventional capacitors. This, on the one hand, significantly saves row materials (tantalum, niobium) needed for the manufacture of an electronic circuit, thereby making it relatively inexpensive as compared to the conventional one, and, on the other hand, enables miniaturization of the electronic device. The construction and manufacturing principles of such an electrode, as well as a capacitor containing the same, may be of any known type, e.g., as described above.

Those skilled in the art will readily appreciate that various modifications and changes can be applied to the invention as hereinbefore exemplified without departing from its scope defined in and by the appended claims.

What is claimed is:

1. A method of treatment of an initial powder of a metal selected from a group consisting of tantalum, niobium and mixtures thereof for developing the surface of the initial selected metal powder particles, the method comprising the steps of:
    (a) mechanically alloying the initial selected metal powder with a powder of an auxiliary substance having relatively weak corrosion resistance as compared to that of the selected metal, thereby providing interaction between the particles of the selected metal and the auxiliary substance powders, wherein the mechanical alloying is continued until a solid solution of the selected metal and the substance is obtained, in which the metal particle has a substantially developed surface area and is at least partly wetted with said substance substantially within a surface region of the metal particle; and
    (b) removing the substance from the obtained solid solution, thereby leaving the selected metal particles with the substantially developed surface area free from the substance.

2. The method according to claim 1, wherein said auxiliary substance having relatively weak corrosion resistance contains at least one metal.

3. The method according to claim 2, wherein said at least one metal is either one of the following list: Fe, Cu, Mn, Ti, Ni, Al, Md, Zn, Cd, Co, Mo.

4. The method according to claim 1, wherein said auxiliary substance having relatively weak corrosion resistance contains at least one metal alloy.

5. The method according to claim 4, wherein said at least one metal alloy is a steel powder.

6. The method according to claim 4, wherein said at least one metal alloy is amorphous alloy in the form of amorphous powder.

7. The method according to claim 6, wherein said amorphous powder is prepared by milling amorphous ribbon produced by rapid quenching.

8. The method according to claim 1, wherein the step of removing the substance include chemical etching.

9. The method according to claim 8, wherein said chemical etching utilizes an acid solution as an active ingredient.

10. The method according to claim 9, wherein said acid solution is $HNO_3$, $HCl$ or $H_2SO_4$.

11. The method according to claim 9, wherein said acid solution is a mixture of either two of the following acids: $HNO_3$, $HCl$ or $H_2SO_4$.

12. The method according to claim 9, wherein said etching comprises at least two sequential cycles, each next cycle starting with removing reaction products and adding an additional portion of the acid.

13. The method according to claim 12, wherein said etching includes the step of heating reacting products up to a predetermined temperature.

14. The method according to claim 13, wherein said desired temperature is in the range 80–90°.

15. The method according to claim 13, wherein said desired temperature is such as to cause low boiling of the reacting products.

16. The method according to claim 8, and also comprising the step of:
    upon completing the etching, applying a decantation process to obtain a flushed selected metal powder.

17. The method according to claim 16, and also comprising the step of washing the flushed metal by using a dialysis unit.

18. The method according to claim 17, wherein the step of washing is carried out with an applied voltage within the range 200–400 V.

19. The method according to claim 18, wherein the washing proceeds until the specific resistance of water reaches the value of $10^{-6}$ $Ohm^{-1}cm^{-1}$.

20. The method according to claim 16, and also comprising the step of:
    filtering and drying the obtained selected metal powder.

21. The method according to claim 20, wherein the drying proceeds at the temperature of approximately 120°.

22. The method according to claim 1, comprising the step of removing particles having dimensions less than a desired value.

23. The method according to claim 1, that enables to obtain the alloying depth of 10–20% of the tantalum particle's size.

24. The method according to any one of preceding claims, wherein said initial tantalum powder has particles size in the range of about 0.2–50 $\mu$m.

25. A metal powder having substantially increased BET surface area prepared from an initial powder of a metal selected from a group consisting of tantalum, niobium and mixtures thereof by a method comprising the following steps:
    mechanically alloying the initial selected metal powder with a powder of an auxiliary substance having relatively weak corrosion resistance as compared to that of the selected metal, thereby providing interaction between the particles of the selected metal and the substance powders, wherein the mechanical alloying is continued until a solid solution of the selected metal and the substance is obtained, in which the selected metal particle has a substantially developed surface area and is at least partly wetted with said substance substantially within a surface region of the selected metal particle; and
    removing the substance from the obtained solid solution, thereby leaving the selected metal particles with the substantially developed surface area free from the substance;
    wherein said increased surface area reaches 40 $m^2/g$ and more.

26. An electrode prepared with the selected metal powder of claim 25.

27. A capacitor containing the electrode of claim 26.

* * * * *